(12) United States Patent
Ikeda et al.

(10) Patent No.: US 7,194,748 B2
(45) Date of Patent: Mar. 20, 2007

(54) OBJECTIVE LENS DRIVER AND DISK DRIVE DEVICE COMPRISING THE SAME

(75) Inventors: Naoto Ikeda, Saitama (JP); Teruaki Higashihara, Tokyo (JP)

(73) Assignee: Sony Corporation, Tokyo (JP)

( * ) Notice: Subject to any disclaimer, the term of this patent is extended or adjusted under 35 U.S.C. 154(b) by 967 days.

(21) Appl. No.: 10/167,412

(22) Filed: Jun. 13, 2002

(65) Prior Publication Data

US 2003/0007430 A1    Jan. 9, 2003

(30) Foreign Application Priority Data

Jun. 14, 2001 (JP) .............................. 2001-180226

(51) Int. Cl.
*G11B 7/08* (2006.01)

(52) U.S. Cl. ..................................................... 720/683

(58) Field of Classification Search .................... None
See application file for complete search history.

(56) References Cited

U.S. PATENT DOCUMENTS

| 4,386,823 A | | 6/1983 | Musha ..................... 369/44.11 |
| 4,504,935 A | | 3/1985 | Jansen ..................... 369/44.16 |
| 4,752,117 A | * | 6/1988 | Ichikawa et al. ........... 359/814 |
| 5,105,405 A | * | 4/1992 | Hashimoto et al. ...... 369/44.22 |
| 5,305,151 A | | 4/1994 | Kakimoto et al. .......... 359/814 |
| 5,453,881 A | * | 9/1995 | Suzuki ....................... 359/824 |
| 5,506,732 A | * | 4/1996 | Mori .......................... 359/824 |
| 5,513,047 A | * | 4/1996 | Matsui ....................... 359/824 |
| 5,581,533 A | | 12/1996 | Fujisawa ............... 369/112.23 |
| 6,687,062 B2 | * | 2/2004 | Nakamura et al. .......... 359/814 |

FOREIGN PATENT DOCUMENTS

JP            11161984 A  *  6/1999

* cited by examiner

*Primary Examiner*—David Davis
(74) *Attorney, Agent, or Firm*—Oblon, Spivak, McClelland, Maier & Neustadt, P.C.

(57) ABSTRACT

The present invention relates to an objective lens driver including: a support base formed of a magnetic material, comprising a base portion, a support shaft projected from the base portion, and a pair of yokes respectively projected in the same direction as the support shaft from both side edges of the base portion and located oppositely to each other with the support shaft therebetween, the yokes having opposed surfaces to which magnets are fitted; and a movable portion supported on the support shaft of the support base so as to be turnable around the axis of the support shaft and slidable in the axial direction of the support shaft, holding an objective lens having an optical axis substantially coinciding with the axial direction of the support shaft, and comprising a focusing coil supplied with a driving current at the time of focusing control of laser light radiated onto a disk type recording medium through the objective lens, and at least a pair of tracking coils supplied with a driving current at the time of tracking control of the laser light, wherein the magnets, the yokes, the base portion, and the support shaft form a magnetic circuit.

12 Claims, 15 Drawing Sheets

FIG.13

| SYSTEM | PRESENT INVENTION | RELATED ART | RELATED ART | RELATED ART |
|---|---|---|---|---|
| | AXIAL SLIDING | AXIAL SLIDING | WIRE | LEAF SPRING |
| FOCUSING ACCELERATION SENSITIVITY (G/V) | 9.6 | 4.7 | 9.6 | 10.8 |
| TRACKING ACCELERATION SENSITIVITY (G/V) | 9.6 | 7.5 | 4 | 6.5 |

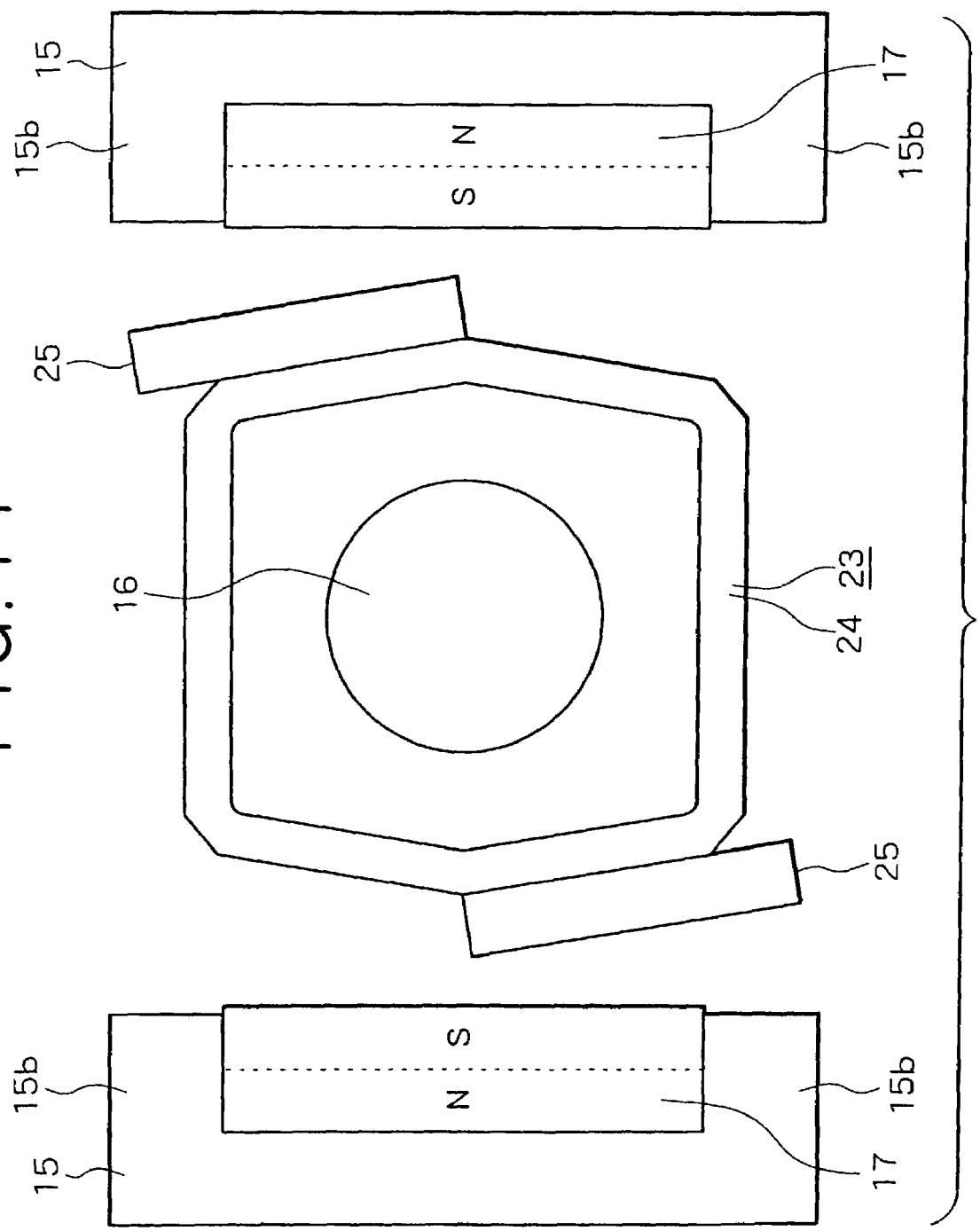

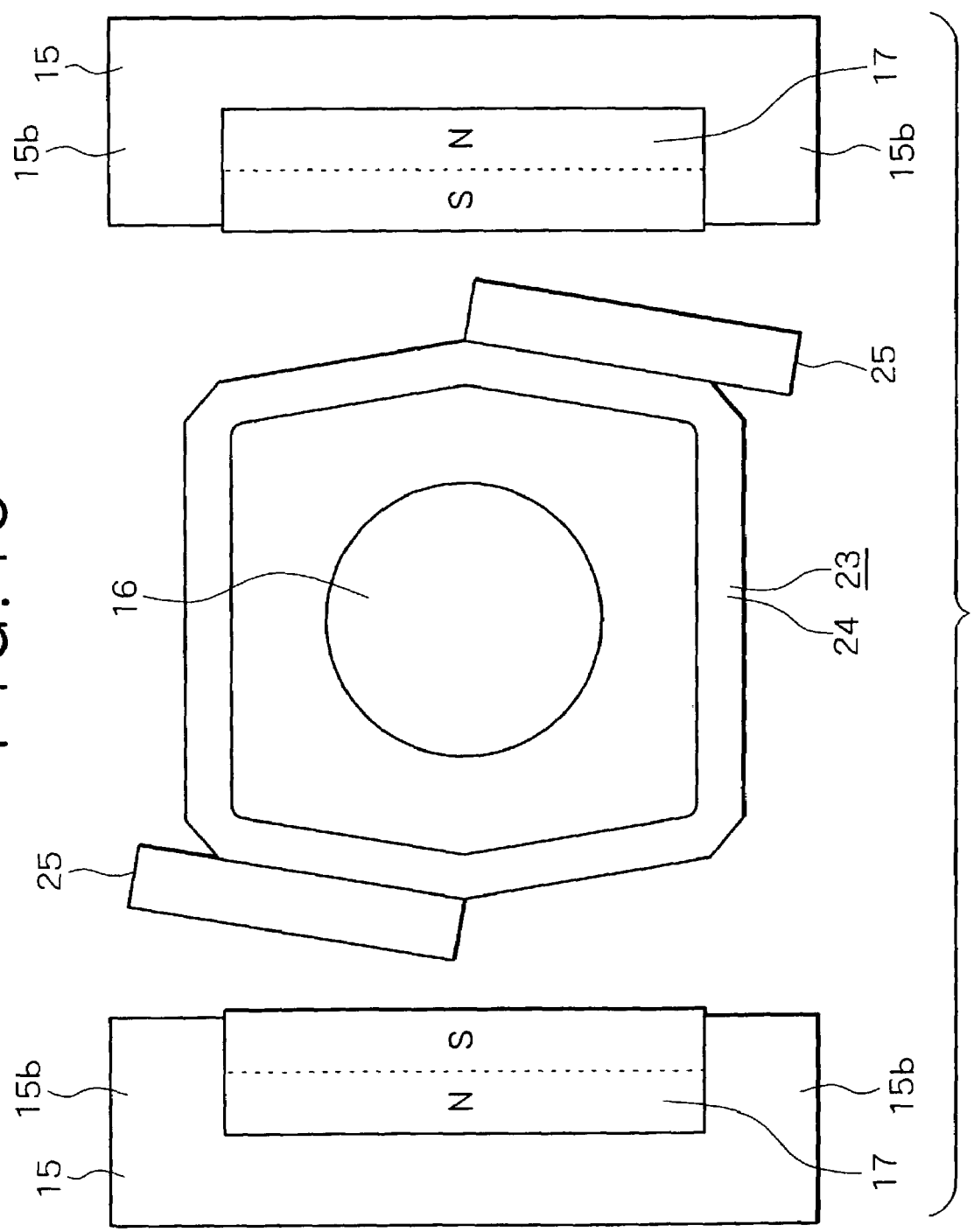

OBJECTIVE LENS DRIVER AND DISK DRIVE DEVICE COMPRISING THE SAME

BACKGROUND OF THE INVENTION

The present invention relates to an objective lens driver and a disk drive device comprising the same. More particularly, the invention relates to an objective lens driver in which a movable portion is turnably and slidably supported on a support shaft, and a disk drive device comprising the same.

A disk drive device for recording and reproduction of a signal recorded on a disk type recording medium such as an optical disk is known. Such a disk drive device comprises an optical pickup which is moved in the radial direction of the disk type recording medium and irradiates the disk type recording medium with laser light.

Such an optical pickup is provided with an objective lens driver comprising an objective lens, and focusing control and tracking control are performed by the objective lens driver at the time of recording or reproduction of signals on the disk type recording medium, whereby a spot of the laser light radiated onto the disk type recording medium through the objective lens is focused on a recording track.

As an objective lens driver, there is known a so-called axial sliding type objective lens driver in which a movable portion is supported on a support shaft so as to be turnable around the axis thereof and slidable in the axial direction, and focusing control and tracking control are performed by moving the movable portion relative to the disk type recording medium. Such an axial sliding type objective lens driver has the merits that the weight balance of the movable portion on the support shaft is good, aseismatic property in the tracking direction is excellent, displacement of the movable portion in the tracking direction relative to the support shaft by its own weight would not easily occur, and, further, skewing in the operating condition is little.

However, the related-art axial sliding type objective lens driver has the problems that, since a pair of inside yokes, a pair of magnets and a pair of outside yokes are disposed on the opposite sides with respect to the support shaft, the number of components is large, a reduction in size is difficult, and the manufacturing cost is high.

SUMMARY OF THE INVENTION

Accordingly, it is an object of the present invention to contrive a reduction in the size of an objective lens driver and a disk drive device comprising the same, while securing good characteristics of the objective lens driver.

In accordance with one aspect of the present invention, there is provided an objective lens driver including: a support base formed of a magnetic material, comprising a base portion, a support shaft projected from the base portion, and a pair of yokes respectively projected in the same direction as the support shaft from both side edges of the base portion and located oppositely to each other with the support shaft therebetween, the yokes having opposed surfaces to which magnets are fitted; and a movable portion supported on the support shaft of the support base so as to be turnable around the axis of the support shaft and slidable in the axial direction of the support shaft, holding an objective lens having an optical axis substantially coinciding with the axial direction of the support shaft, and comprising a focusing coil supplied with a driving current at the time of focusing control of laser light radiated onto a disk type recording medium through the objective lens, and at least a pair of tracking coils supplied with a driving current at the time of tracking control of the laser light, wherein the magnets, the yokes, the base portion, and the support shaft form a magnetic circuit.

Since no yoke is required on the inside of the magnets as a component of a magnetic circuit in the objective lens driver, it is possible to contrive a reduction in the size of the objective lens driver and to secure good sensitivity.

Preferably, the objective lens driver further includes: a magnetic member formed in a roughly ring form, including a pair of projection portions maximum in outside diameter with a central portion therebetween, and fitted to the movable portion, the pair of projection portions being respectively attracted toward central portions of the magnets so as thereby to hold the movable portion in a neutral position in a focusing direction and in a tracking direction. Therefore, in each case where the movable portion is moved in the focusing direction or in the tracking direction, a force for moving the movable portion toward its neutral position is generated by the magnetic member, so that the movable portion is appropriately maintained in its neutral position in the focusing direction and the tracking direction by a required minimum number of members.

Moreover, only if the magnetic member having a roughly ring shape is provided with a predetermined configuration to be fitted to the movable portion, then it is possible to appropriately, reliably hold the movable portion in a neutral position. Therefore, it is possible to contrive a reduction in production cost through a reduction in the number of component parts and an enhancement of working efficiency.

Preferably, the yokes are each provided with cover portions formed of a magnetic material, the cover portions covering surfaces at least on one side of the magnets in a direction orthogonal to the axial direction of the support shaft and orthogonal to a direction connecting the yokes. Therefore, since the magnetic fluxes generated from end portions of the magnets are returned to the magnets through the cover portions, flux leakage can be restrained, and an enhancement of driving efficiency of the objective lens driver can be contrived.

Preferably, the objective lens driver further includes: a cover formed of a magnetic material located on the opposite side of the base portion of the support base with respect to the movable portion and covering the movable portion, wherein an end edge on the objective lens side of the cover is bent to the side of the movable portion to form a bent portion. Therefore, leaking fluxes directed toward the recording surface side of the disk type recording medium are taken in through the bent portions, and the effects of the leaking fluxes on a reproduction operation and a recording operation can be obviated, so that more appropriate reproduction and recording operations can be contrived.

In accordance with another aspect of the present invention, there is provided a disk drive device in which a disk type recording medium fitted to a disk table is rotated by a driving motor, and a recording surface of the rotated disk type recording medium is irradiated with laser light through an objective lens of an objective lens driver, the objective lens driver including: a support base formed of a magnetic material, including a base portion, a support shaft projected from the base portion, and a pair of yokes respectively projected in the same direction as the support shaft from both side edges of the base portion and located oppositely to each other with the support shaft therebetween, the yokes having opposed surfaces to which magnets are fitted; and a movable portion supported on the support shaft of the support base so as to be turnable around the axis of the support shaft and slidable in the axial direction of the support shaft, holding the objective lens having an optical axis substantially coinciding with the axial direction of the support shaft, and including a focusing coil supplied with a driving current at the time of focusing control of laser light radiated onto the disk type recording medium through the objective lens, and at least a pair of tracking coils supplied with a driving current at the time of tracking control of the laser light, wherein the magnets, the yokes, the base portion, and the support shaft form a magnetic circuit.

Since no yoke is required on the inside of the magnets as a component of the magnetic circuit in the objective lens driver provided in the disk drive device, it is possible to contrive a reduction in the size of the disk drive device through a reduction in the size of the objective lens driver, to secure good sensitivity of the objective lens driver, and to enhance the reliability of the disk drive device.

Preferably, the disk drive device further includes: a magnetic member formed in a roughly ring form, comprising a pair of projection portions maximum in outside diameter with a central portion therebetween, and fitted to the movable portion, the pair of projection portions being respectively attracted toward central portions of the magnets so as thereby to hold the movable portion in a neutral position in a focusing direction and in a tracking direction. Therefore, in each case where the movable portion is moved in the focusing direction or in the tracking direction, a force for moving the movable portion toward its neutral position is generated by the magnetic member, so that the movable portion is appropriately maintained in its neutral position in the focusing direction and the tracking direction by a required minimum number of members.

Moreover, only if the magnetic member having a roughly ring shape is provided with a predetermined configuration to be fitted to the movable portion, then it is possible to appropriately, reliably hold the movable portion in a neutral position. Therefore, it is possible to contrive a reduction in production cost through a reduction in the number of component parts and an enhancement of working efficiency.

Preferably, the yokes are each provided with cover portions formed of a magnetic material, the cover portions covering surfaces at least on one side of the magnets in a direction orthogonal to the axial direction of the support shaft and orthogonal to a direction connecting the yokes. Therefore, since the magnetic fluxes generated from end portions of the magnets are returned to the magnets through the cover portions, flux leakage can be restrained, and an enhancement of driving efficiency of the objective lens driver can be contrived.

Preferably, the disk drive device further includes: a cover formed of a magnetic material located on the opposite side of the base portion of the support base with respect to the movable portion and covering the movable portion, wherein an end edge on the objective lens side of the cover is bent to the side of the movable portion to form a bent portion. Therefore, leaking fluxes directed toward the recording surface side of the disk type recording medium are taken in through the bent portions, and the effects of the leaking fluxes on a reproduction operation and a recording operation can be obviated, so that more appropriate reproduction and recording operations can be contrived.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIGS. 1 to 15 show embodiments of the present invention, in which:

FIG. 1 is a general perspective view of a disk drive device shown together with a disk cartridge;

FIG. 2 is a general perspective view of the inside structure of the disk drive device;

FIG. 3 is an enlarged perspective view of an objective lens driver showing a cover in a separated state;

FIG. 4 is an enlarged exploded perspective view of the objective lens driver;

FIG. 5 is an enlarged plan view of the objective lens driver, with the cover removed;

FIG. 6 is a sectional view taken along line VI-VI of FIG. 5, with the cover fitted;

FIG. 7 is a sectional view taken along line VII-VII of FIG. 5, with the cover fitted;

FIG. 8 is a conceptual view showing a magnetic flux distribution;

FIGS. 9 and 10 show operations in a tracking direction of a movable portion, in which FIG. 9 is an enlarged plan view showing the condition where the movable portion is turned in the direction T1, and FIG. 10 is an enlarged plan view showing the condition where the movable portion is turned in the direction T2;

FIGS. 11 and 12 show operations in a focusing direction of the movable portion, in which FIG. 11 is an enlarged sectional view showing the condition where the movable portion is moved in the direction F1, and FIG. 12 is an enlarged sectional view showing the condition where the movable portion is moved in the direction F2;

FIG. 13 shows the experimental results of measurement of acceleration sensitivities;

FIG. 14 is a conceptual view showing a modified embodiment of the objective lens driver; and FIG. 15 is a conceptual view showing another modified embodiment of the objective lens driver.

DETAILED DESCRIPTION OF THE PREFERRED EMBODIMENTS

Now, embodiments of an objective lens driver and a disk drive device including the same according to the present invention will be described below referring to the accompanying drawings. In the following embodiments, the present invention is applied to a disk drive device capable of reproduction of a disk type recording medium (magneto-optical disk) having a diameter of about 64 mm, and an objective lens driver provided therein.

Figure 1:
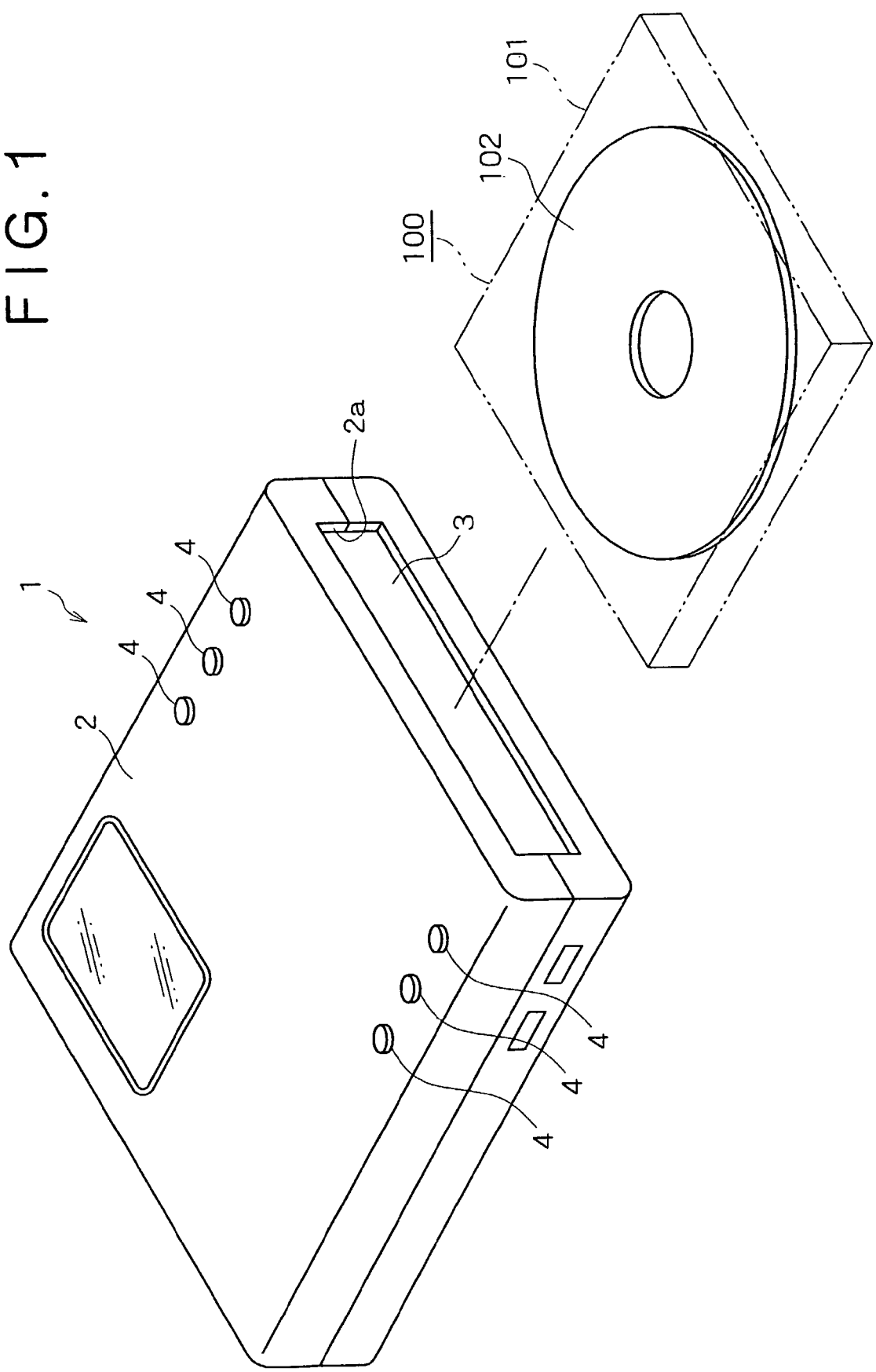
Figure 2:
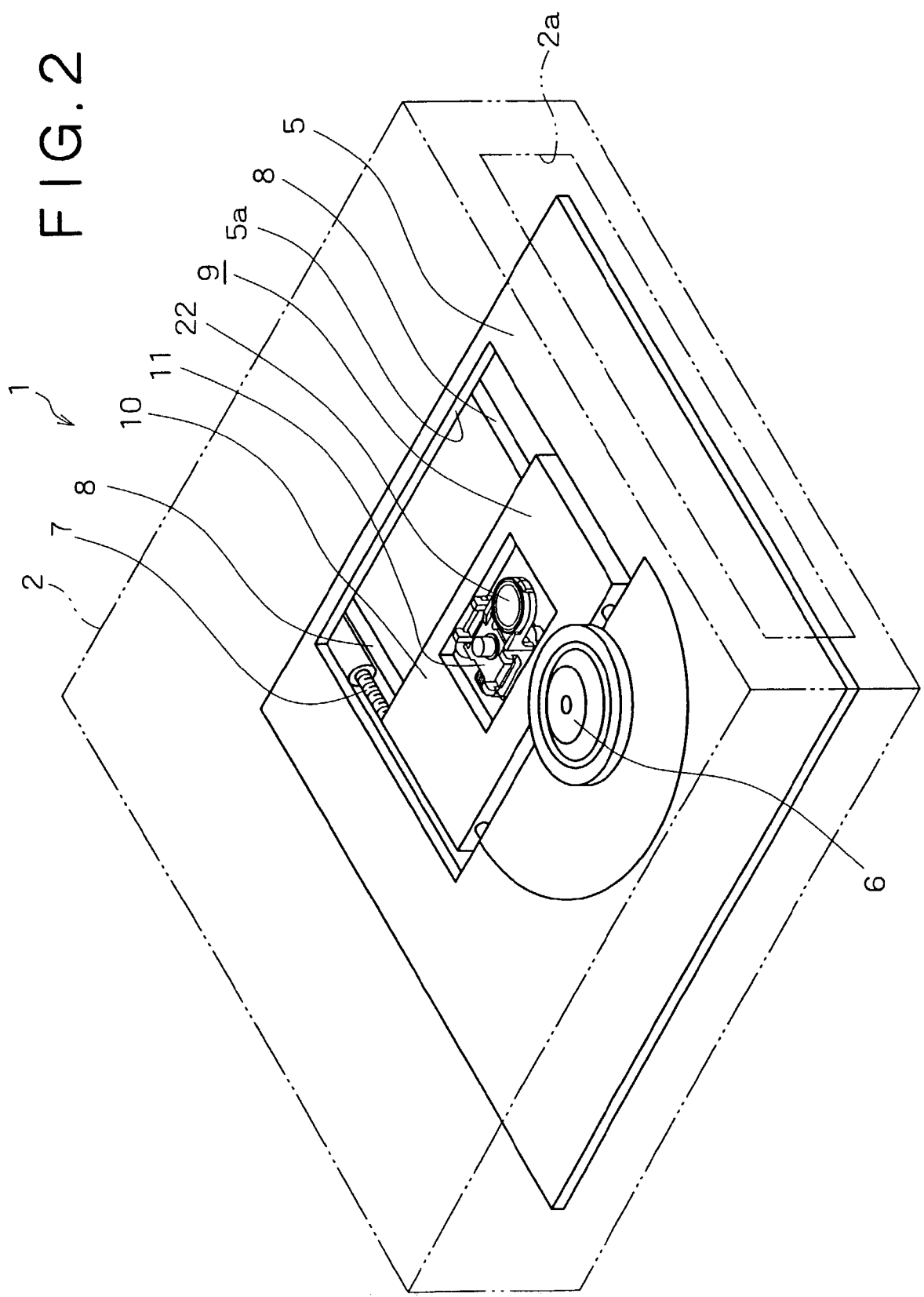
Figure 3:
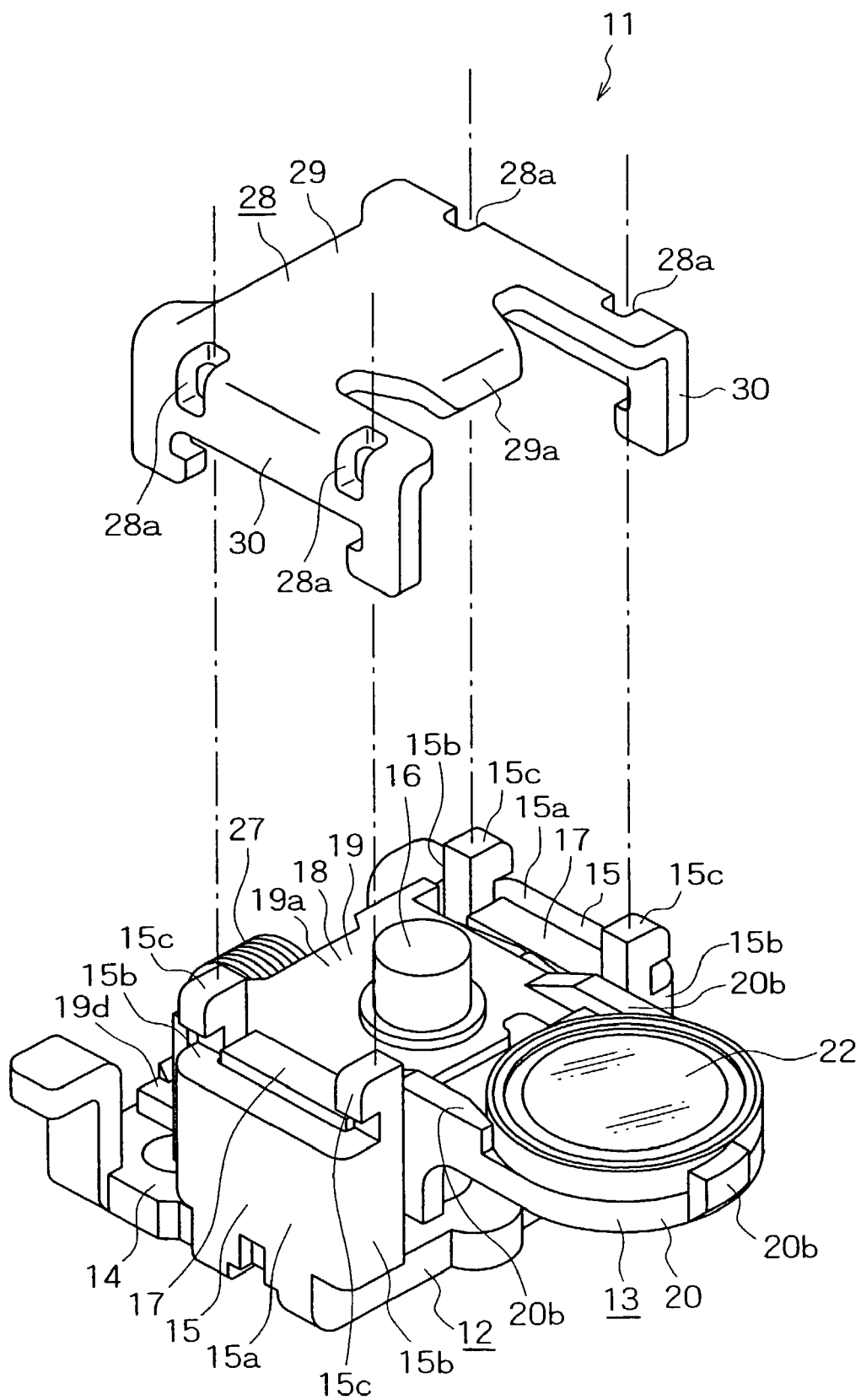

The disk drive device 1 includes desired component members and mechanisms disposed in a thin box like housing 2, and a front surface of the housing 2 is provided with a rectangular load/eject port 2a (See FIGS. 1 and 2). A door 3 for opening and closing the load/eject port 2a is supported on the housing 2 (See FIG. 1), and the door 3 is operated to open the load/eject port 2a when a disk cartridge 100 is loaded into the housing 2 or is ejected from the housing 2.

The disk cartridge 100 includes a flat case body 101 in which a disk type recording medium 102 having a diameter of about 64 mm is rotatably contained (See FIG. 1).

Operation buttons 4 for displaying various functions are disposed at predetermined positions of the housing 2 (See FIG. 1). For example, reproduction, stoppage of operation, change of sound volume, ejection of the disk cartridge from the housing 2, various editing functions and the like are performed by operating the operation buttons 4.

A chassis 5 is disposed in the housing 2 (See FIG. 2). A driving motor (spindle motor) which is not shown is disposed on the lower side of a substantially central portion of the chassis 5, and a disk table 6 is fixed to a motor shaft of the driving motor.

The chassis 5 is provided with a disposition hole 5a, and the disk table 6 is projected to the upper side of the chassis 5 through the disposition hole 5a (See FIG. 2).

A lead screw 7 and guide shafts 8 are disposed in parallel with each other on the lower side of the chassis 5 (See FIG. 2). At a position corresponding to the disposition hole 5a of the chassis 5, an optical pickup 9 is supported so as to be movable in the radial direction of the disk type recording medium 102 fitted to the disk table 6.

The optical pickup 9 includes required members disposed on a movable base 10. In the optical pickup 9, one end portion of the movable base 10 is screw engaged with the lead screw 7, and both end portions of the movable base 10 are slidably supported on the guide shafts 8. The optical pickup 9 is moved in the radial direction of the disk type recording medium 102 while being guided by the guide shafts 8, by rotation of the lead screw 7.

The objective lens driver 11 includes a support base 12 and a movable portion 13 supported by the support base 12 (See FIGS. 3 to 7).

The support base 12 includes a base portion 14, yokes 15 respectively bent upwards from both side edges of the base portion 14, and a support shaft 16 projected upwards from a substantially central portion of the base portion 14.

The yoke 15 includes a main surface portion 15a, and cover portions 15b bent oppositely, inwardly from both edges in the longitudinal direction of the main surface portion 15a, and engaging projection portions 15c are provided on the upper side of and in connection with the cover portions 15b. Positioning projection portions 15d are provided at lower end portions and on the inner surface sides of the main surface portions 15a.

Magnets 17 are fixed on the inside surfaces of the yokes 15, respectively. The magnets 17 have the same pole on their surfaces facing to each other, and their surfaces on the side of the support shaft 16 are S poles (See FIG. 5). The facing surfaces of the magnets 17 may be N poles.

The magnets 17 are respectively fitted to the inside surfaces of the yokes 15 by, for example, adhesion. The magnets 17 are positioned in the vertical direction by the positioning projection portions 15d of the support base 12. Of each of the magnets 17, the two surfaces orthogonal to the surface fitted to the yokes 15 are covered by the cover portions 15b (See FIG. 3).

The movable portion 13 includes required members fitted to a bobbin 18.

The bobbin 18 is formed of a resin material, and includes a main body portion 19 and a lens holder portion 20 projected to the front side from the main body portion 19.

The main body portion 19 includes an upper surface portion 19a, side surface portions 19b respectively projected downwards from both side edges of the upper surface portion 19a, and a rear surface portion 19c projected downwards from the rear edge of the upper surface portion 19a, and a balancer fitting portion 19d is projected to the rear side from the lower edge of the rear surface portion 19c. A supported tube portion 19e projected downwards is provided at a substantially central portion of the upper surface portion 19a (See FIGS. 6 and 7).

Figure 5:
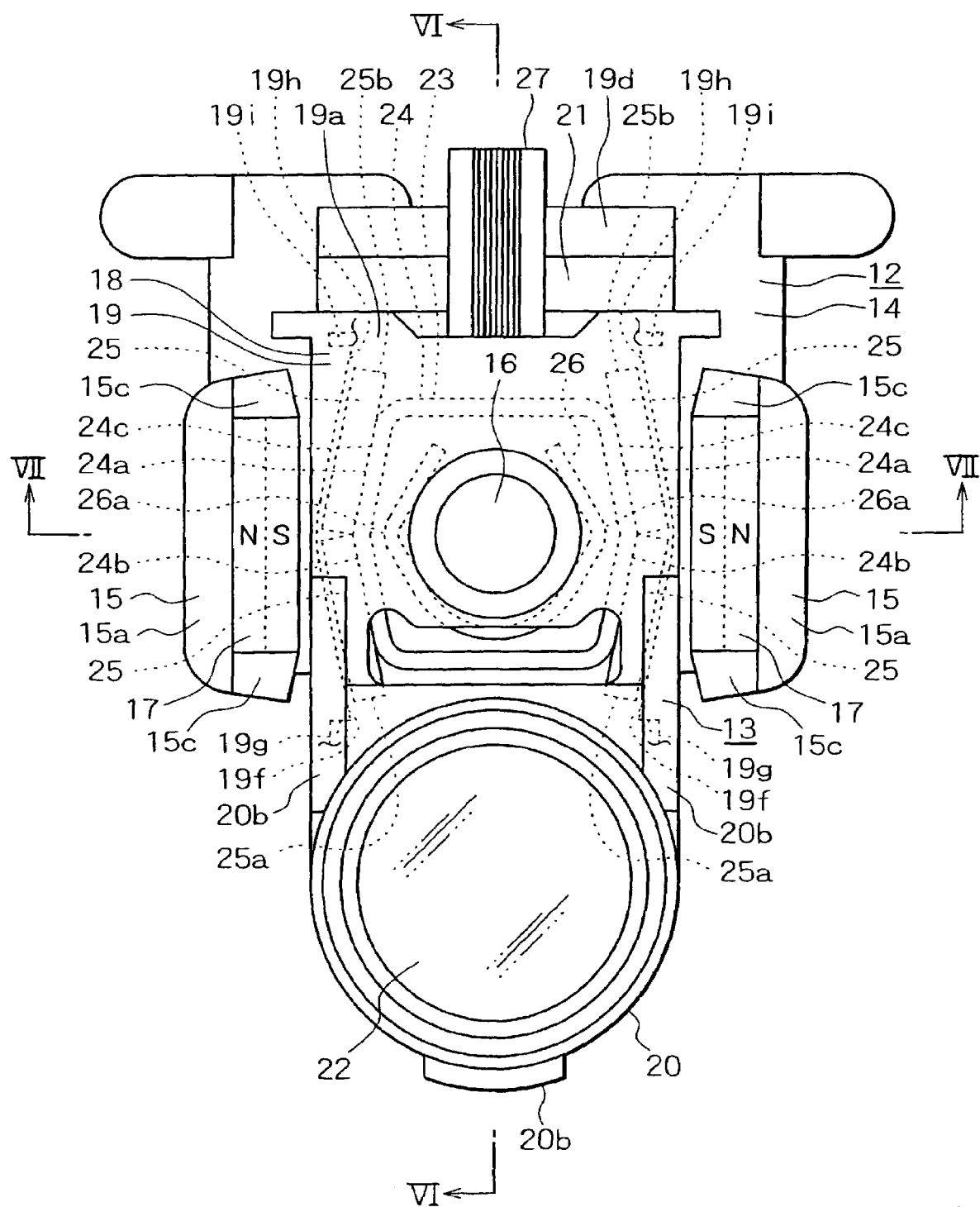

Of the inside surfaces of the side surface portions 19b, front half portions 19f are inclined to be displaced outwards as the front side is approached, and are increased in thickness that much to form front side ribs 19g (See FIG. 5). Besides, of the inside surfaces of the side surface portions 19b, rear half portions 19h are inclined to be displaced outwards as the rear side is approached, and are increased in thickness that much to form rear side ribs 19i (See FIG. 5).

The lens holder portion 20 is provided with a through-hole 20a, and three lens holding projection portions 20b are provided at the circumferential edge of the through-hole 20a.

Figure 4:
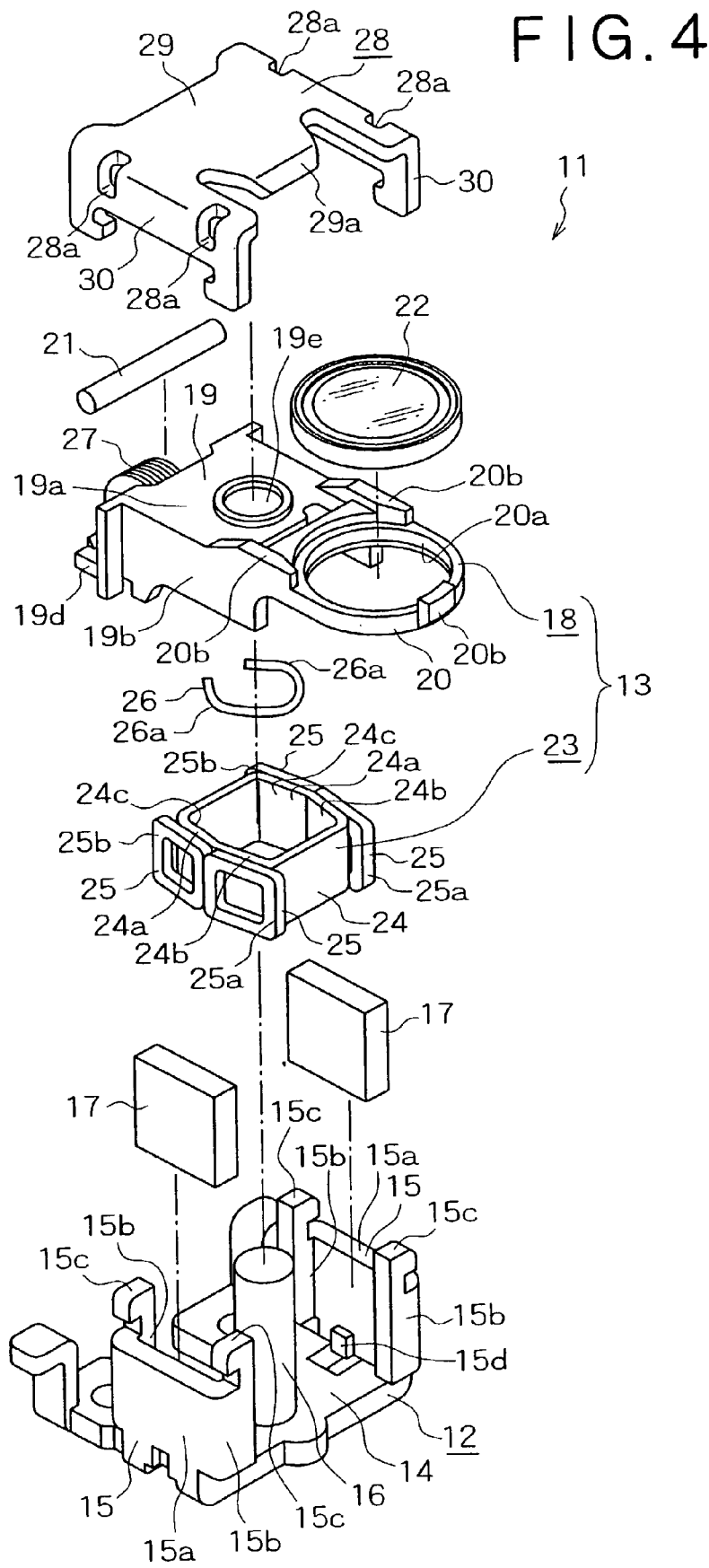
Figure 6:
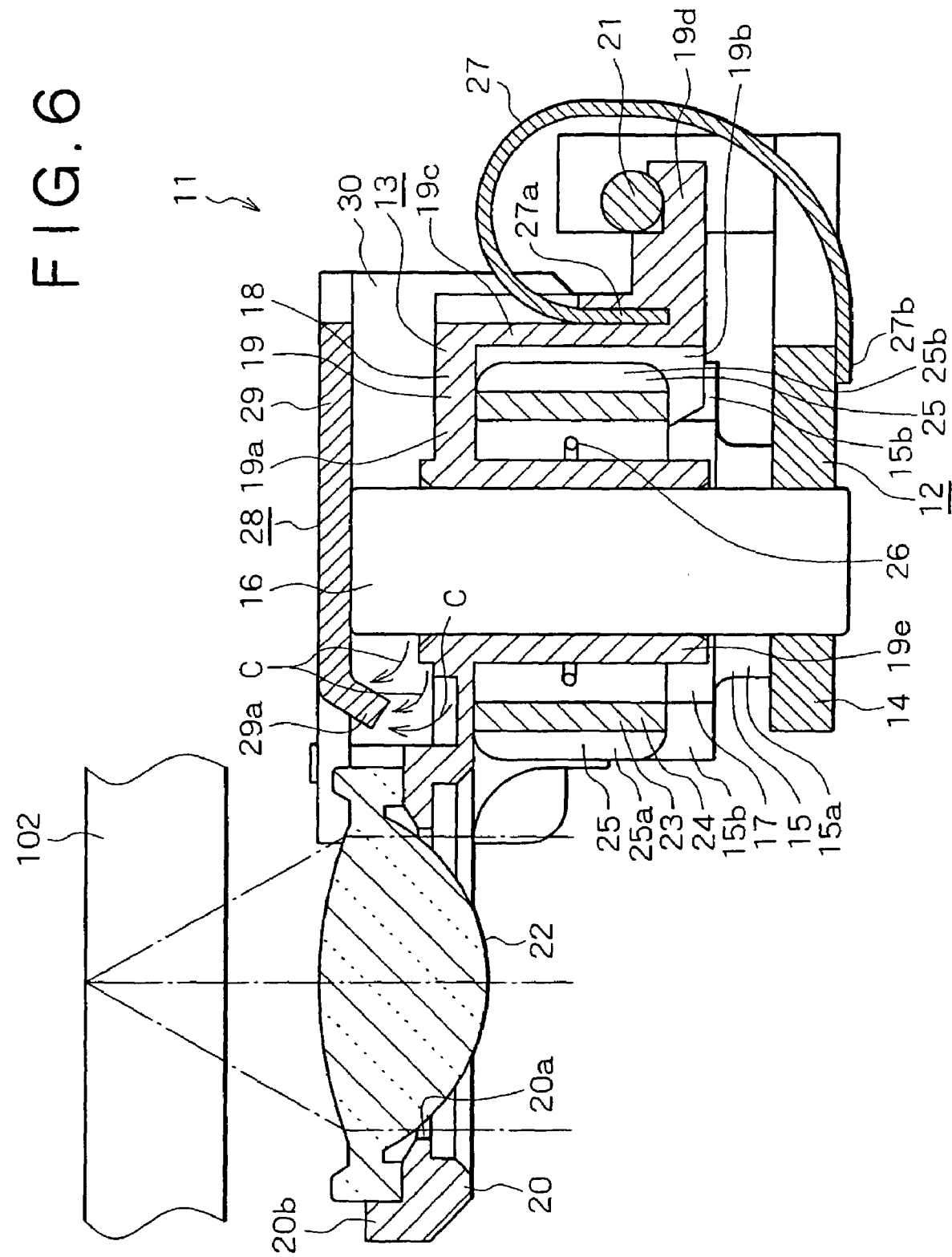

A balancer 21 having a circular cylindrical shape is fitted to the balancer fitting portion 19d of the bobbin 18 (See FIGS. 4 and 6).

An objective lens 22 is held on the lens holder portion 20 of the bobbin 18 in the state of being pressed by the three holding projection portions 20b from the periphery thereof.

A coil body 23 is fitted to the lower surface of the upper surface portion 19a of the bobbin 18 (See FIGS. 4 to 7). The coil body 23 has a structure in which pairs of tracking coils 25 are fitted respectively to both side portions 24a of a focusing coil 24 wound in a roughly prismatic form with its axial direction set vertical. Of side portions 24a of the focusing coil 24, front side portions 24b are inclined to be displaced outwards as the rear side is approached, and rear side portions 24c are inclined to be displaced outwards as the front side is approached (See FIGS. 4 and 5).

The tracking coils 25 located on the front side are fitted respectively to the front side portions 24b of the focusing coil 24, and front end portions thereof are projected forwards from the front end of the focusing coil 24. The tracking coils 25 located on the rear side are fitted respectively to the rear side portions 24c of the focusing coil 24, and rear end portions thereof are projected rearwards from the rear end of the focusing coil 24. Since the side portions 24a of the focusing coil 24 are inclined as described above, the tracking coils 25 are in the state of being inclined along the front side portions 24b or the rear side portions 24c of the focusing coil 24.

A magnetic member 26 formed of a linear magnetic metal material is fitted to the supported tube portion 19e of the bobbin 18 (See FIGS. 4 to 7). The magnetic member 26 is roughly ring shaped with the rear side opened, and a pair of projection portions 26a maximum in outside diameter are formed on both left and right sides, with a central portion therebetween, of the magnetic member 26. The magnetic member 26 is fitted to the supported tube portion 19e so that the projection portions 26a are located correspondingly to positions between the front side portions 24b and the rear side portions 24c of the focusing coil 24 (See FIG. 5).

With the support shaft 16 inserted in the supported tube portion 19e, the movable portion 13 is supported on the support shaft 16 so as to be slidable in the axial direction of the support shaft 16 and turnable around the axis of the support shaft 16 (See FIGS. 3, 5, 6 and 7). The axial direction of the support shaft 16 is a focusing direction in which focusing control for the disk type recording medium 102 is performed, and the direction around the axis of the support shaft 16 is a tracking direction in which tracking control for the disk type recording medium 102 is performed.

Figure 7:
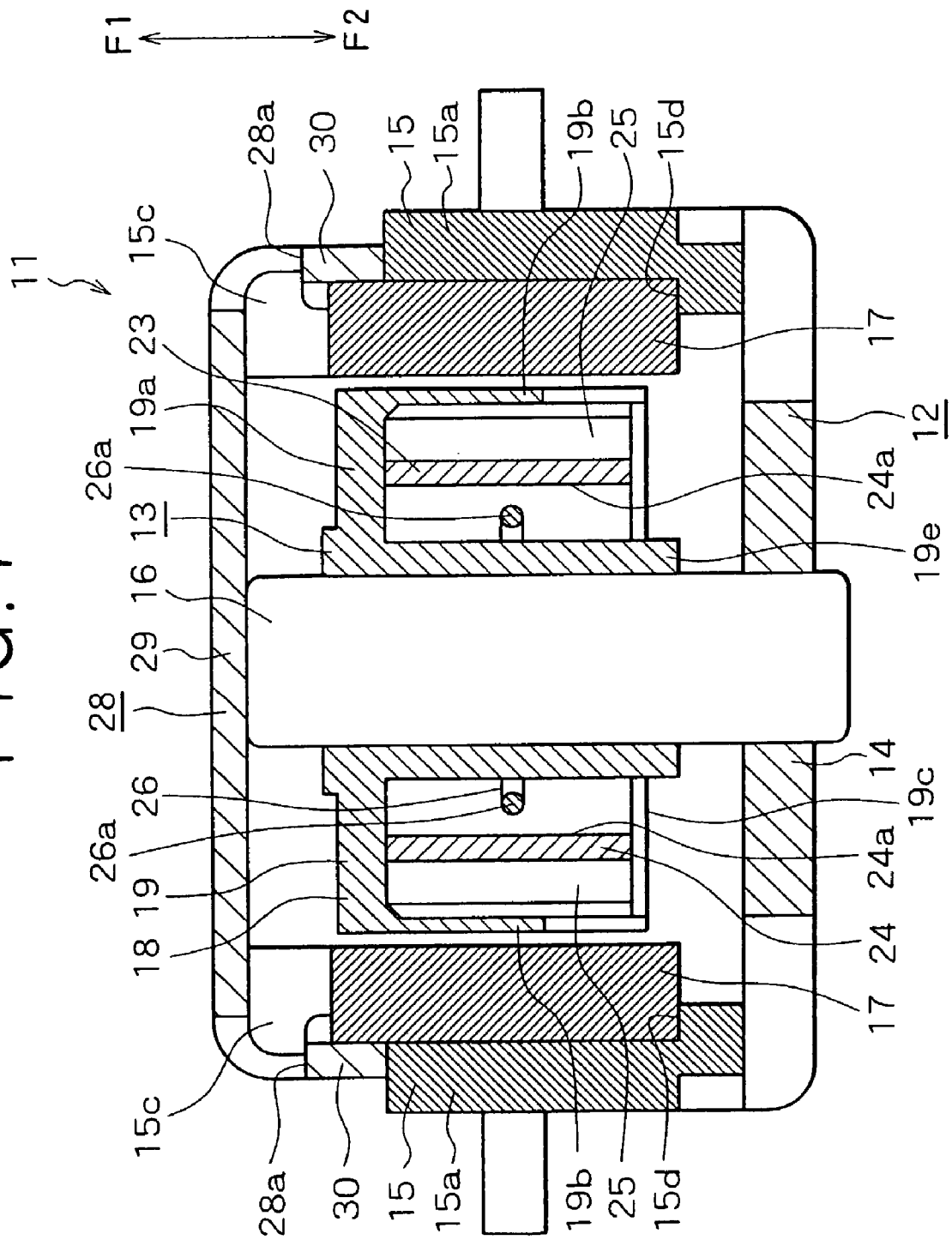

In the condition where the movable portion 13 is supported on the support shaft 16, the magnets 17 are oppositely located directly on the outside of the side surface portions 19b of the bobbin 18 (See FIG. 7). In the condition where the movable portion 13 is supported on the support shaft 16, one end portion 27a of a flexible printed substrate 27 is fitted to the bobbin 18, and the other end portion 27b of the flexible printed substrate 27 is fitted to the base portion 14 of the support base 12. The one end portion 27a of the flexible printed substrate 27 fitted to the bobbin 18 is electrically connected to the focusing coil 24 and the tracking coils 25, whereas the other end portion 27b of the flexible printed substrate 27 fitted to the base portion 14 is connected to a driving circuit (not shown) for operating the objective lens driver 11.

In the condition where the movable portion 13 is supported on the support shaft 16, portions 25a, of the tracking coil 25, projected forwards from the front end of the focusing coil 24 are located correspondingly to the cover portions 15b located on the front side of the yoke 15, whereas portions 25b, of the tracking coils 25, projected rearwards from the rear end of the focusing coil 24 are located correspondingly to the cover portions 15b located on the rear side of the yoke 15.

A cover 28 for covering the movable portion 13 is fitted to the support base 12. The cover 28 includes a top plate portion 29 and side plate portions 30 projected downwards from both left and right side edges of the top plate portion 29, which are integrally formed of a magnetic metal material. Of the cover 28, the portions where the top plate portion 29 and the side plate portions 30 are in continuation are provided with engaging holes 28a spaced from each other in the front-rear direction. The front edge of the top plate portion 29 is formed as a bent portion 29a which is bent downwards.

The cover 28 is fitted to the support base 12 by engaging the engaging projection portions 15c of the support base 12 to the engaging holes 28a, respectively (See FIG. 7).

Now, the operation of the disk drive device 1 will be described below.

When the disk cartridge 100 is inserted through the load/eject port 2a of the housing 2, the disk type recording medium 102 is fitted to the disk table 6 and the operation button (reproduction button) 4 is operated, the disk type recording medium 102 is rotated attendant on the rotation of the disk table 6 by the driving of the driving motor. With the disk type recording medium 102 rotated, laser light is emitted from a semiconductor laser (not shown) of the optical pickup 9, and a signal recording surface of the disk type recording medium 102 is irradiated with the laser light through the objective lens 22 (See FIG. 6).

The laser light with which the signal recording surface of the disk type recording medium 102 is irradiated is incident on a light detector (not shown) of the optical pickup 9 as return light, and photo-electric transformation is conducted to reproduce an information signal. At this time, focusing control is conducted by supplying an electric current to the focusing lens 24 and tracking control is conducted by supplying an electric current to the tracking coils 25 so that a spot of the laser light is focused on a recording track of the disk type recording medium 102.

At the time of the focusing control, the movable portion 13 is operated in the axial direction of the support shaft 16 so that the spot of the laser light radiated through the objective lens 22 is focused on the signal recording surface of the disk type recording medium 102. At the time of the tracking control, the movable portion 13 is turned around the axis of the support shaft 16 so that the spot of the laser light radiated through the objective lens 22 is focused on the signal recording surface of the disk type recording medium 102.

In the objective lens driver 11, a magnetic circuit passing through the magnets 17, the yokes 15, the base portion 14 and the support shaft 16 to return to the magnets 17 is formed, when the movable portion 13 is operated in the axial direction of the support shaft 16 or around the axis of the support shaft 16 according to the electric current passing through the focusing coil 24 or the tracking coils 25.

Figure 8:
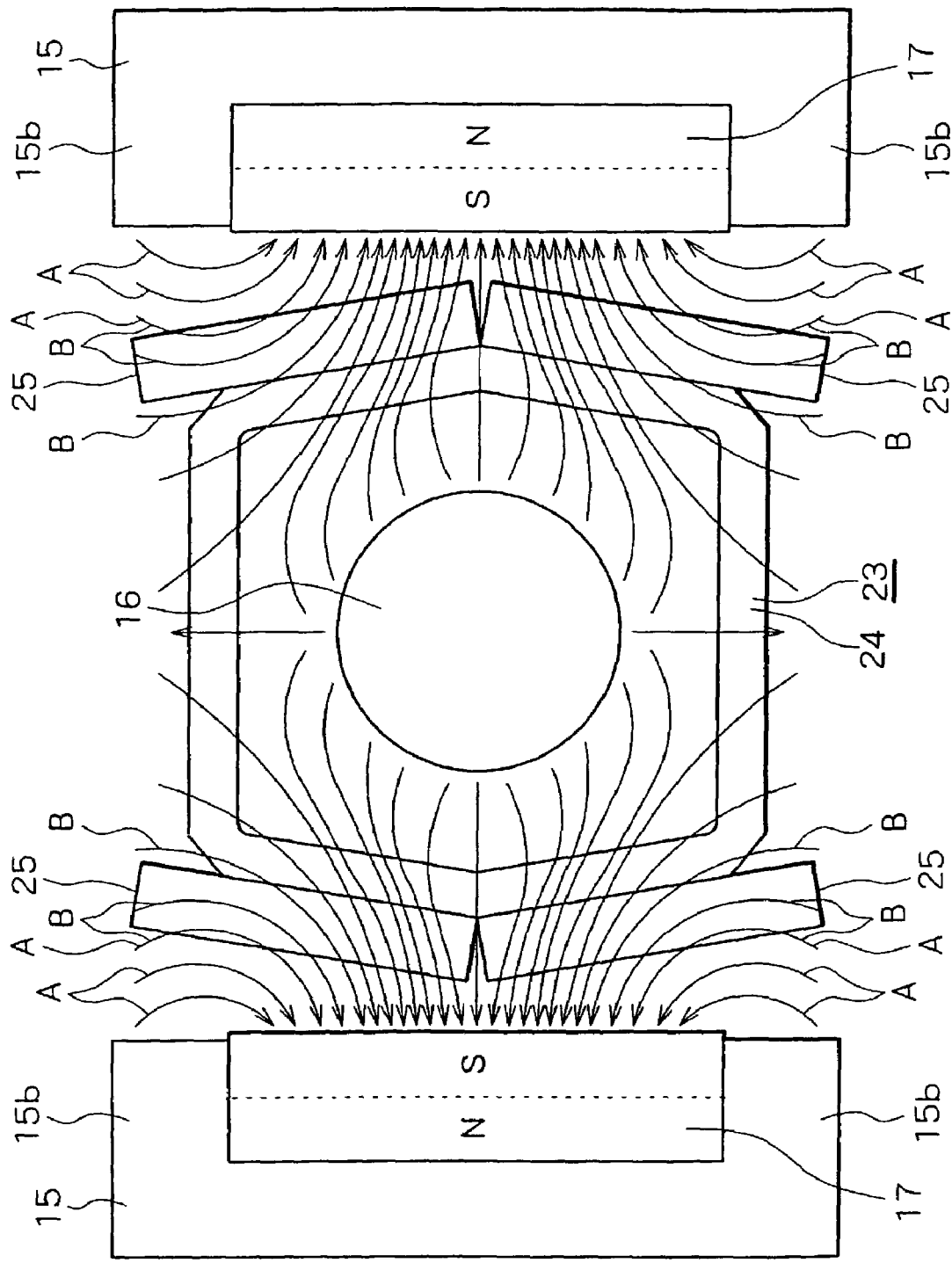

In the objective lens driver 11, the yokes 15 are provided with the cover portions 15b, and magnetic fluxes emitted from front end portions or rear end portions of the magnets 17 are returned to the magnets 17 by the cover portions 15b (See A in FIG. 8). Therefore, magnetic flux leakage can be restrained, and an enhancement of driving efficiency of the objective lens driver 11 can be contrived.

At the time of the tracking control, the movable portion 13 is turned around the axis of the support shaft 16. In this case, since the tracking coils 25 are in the state of being inclined along the front side portions 24b or the rear side portions 24c of the focusing coil 24, the tracking coils 25 on one side located on the front and rear sides in the turned state approach to the condition of being parallel to the magnets 17 (See FIGS. 9 and 10). Therefore, the tracking coils 25 on one side are located at portions where the flux density is high, so that driving efficiency in the tracking direction is enhanced. At this time, the front side portion 24b on one side and the rear side portion 24c on one side of the focusing coil 24 also approach to the condition of being parallel to the magnets 17, so that driving efficiency in the focusing direction is enhanced.

At the time of the tracking control, the movable portion 13 is turned in the tracking direction according to the relationship between the currents flowing vertically through the portions corresponding to central portions of the magnets 17 of the currents flowing through the tracking coils 25, and the magnetic fields, and a force in the direction opposite to the turning direction of the movable portion 13 would be generated by the currents flowing vertically through the portions 25a, 25b projected from the focusing coil 24 of the tracking coils 25.

In the objective lens driver 11, however, the portions 25a, 25b of the tracking coils 25 are located correspondingly to the cover portions 15b of the yokes 15, and the directions of the magnetic fluxes are deflected by the cover portions 15b so as to generate driving forces in the turning direction of the movable portion 13 (See B in FIG. 8). Therefore, the driving forces in the directions for assisting the turning of the movable portion 13 are generated, so that an enhancement of the driving efficiency in the tracking direction can be contrived.

When the focusing control or the tracking control is conducted in the objective lens driver 11, the movable portion 13 is operated relative to the support shaft 16, as described above. In this case, since the side surface portions 19b of the movable portion 13 are provided with the front side ribs 19g and the rear side ribs 19i with an increase in thickness and an increase in stiffness, resonance can be prevented from being generated at the time of operation of the movable portion 13.

Figure 9:
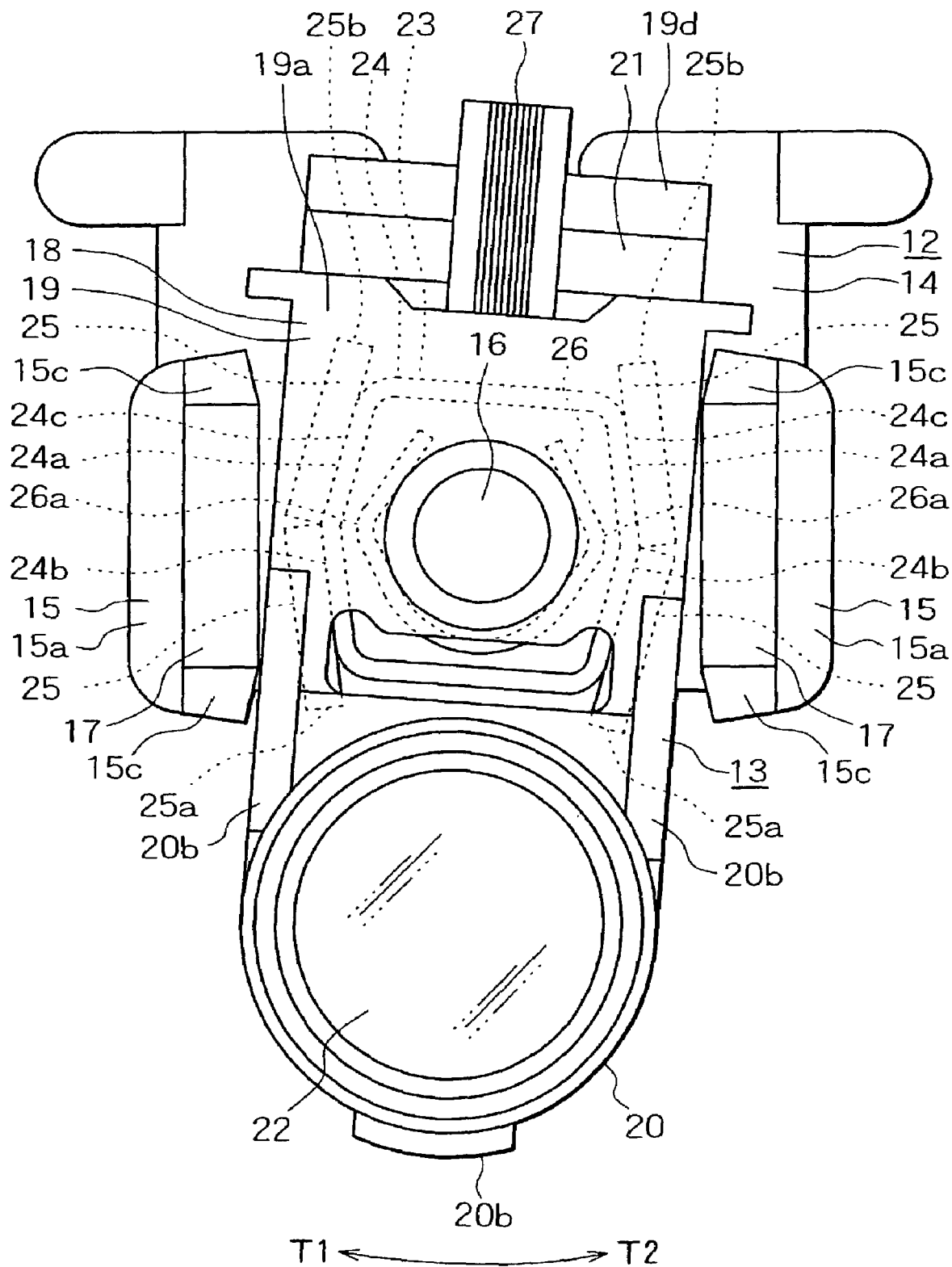
Figure 10:
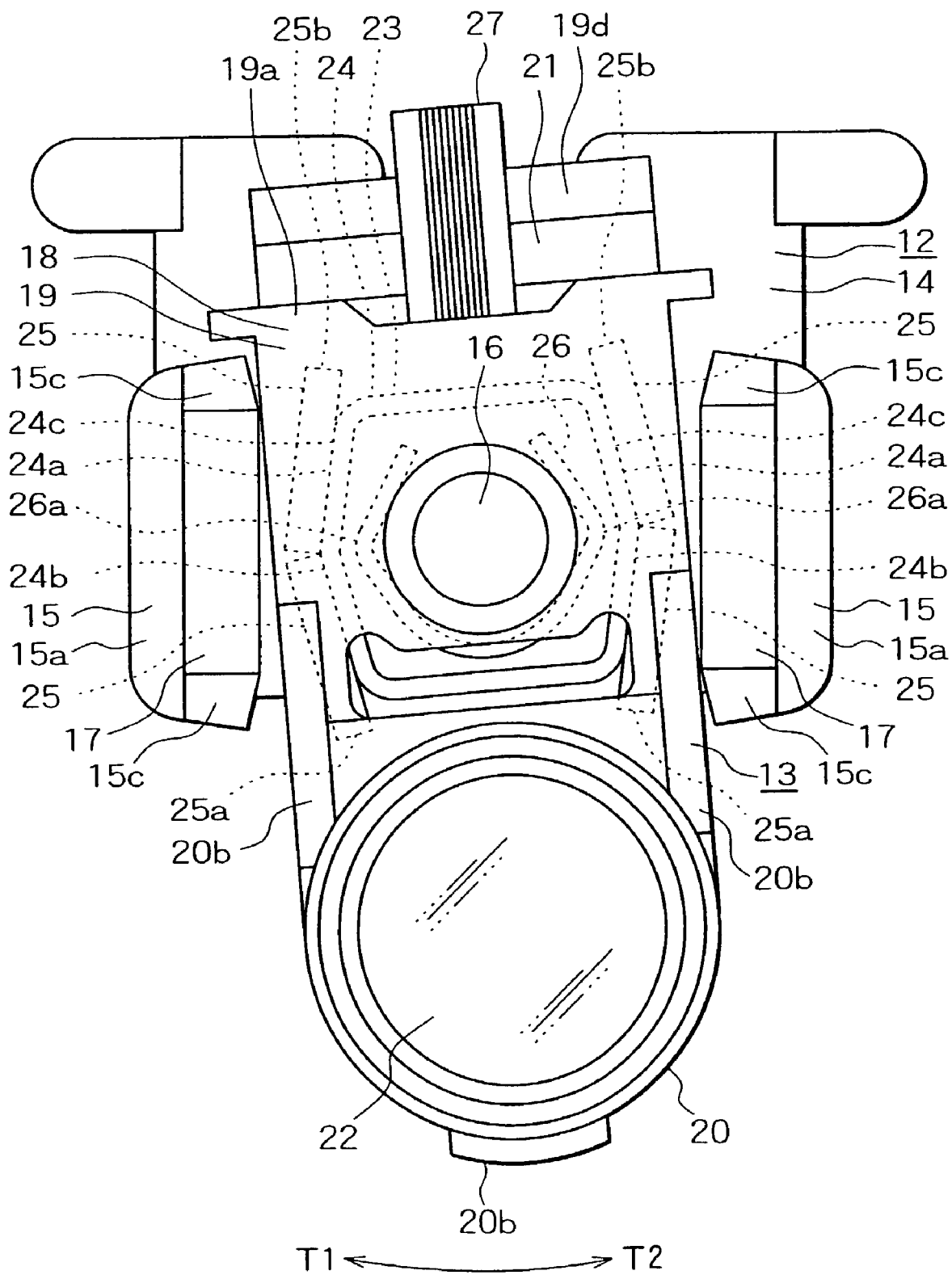

FIGS. 9 and 10 show the operations of the movable portion 13 in the tracking direction.

FIG. 9 shows the condition where the tracking control is performed and the movable portion 13 is moved in the direction T1. Since the tracking coils 25 are supplied with electric currents in such directions as to move the movable portion 13 in the direction T1, the movable portion 13 is moved in the direction T1 from a neutral position thereof; in this case, a force in the direction T2 in which the projection portions 26*a* of the magnetic member 26 are pulled toward central portions of the magnetic fluxes generated from the magnets 17 is generated in the movable portion 13. Therefore, when the supply of the electric currents to the tracking coils 25 in such directions as to move the movable portion 13 in the direction T1 is stopped, the movable portion 13 is turned in the direction T2 to return to the neutral position thereof (See FIG. 5).

FIG. 10 shows the condition where the tracking control is performed and the movable portion 13 is moved in the direction T2. Since the tracking coils 25 are supplied with electric currents in such directions as to move the movable portion 13 in the direction T2, the movable portion 13 is moved in the direction T2 from the neutral position thereof; in this case, a force in the direction T1 in which the projection portions 26*a* of the magnetic member 26 are pulled toward central portions of the magnetic fluxes generated from the magnets 17 is generated in the movable portion 13. Therefore, when the supply of the electric currents to the tracking coils 25 in such directions as to move the movable portion 13 in the direction T2 is stopped, the movable portion 13 is turned in the direction T1 to return to the neutral position thereof (See FIG. 5).

Figure 11:
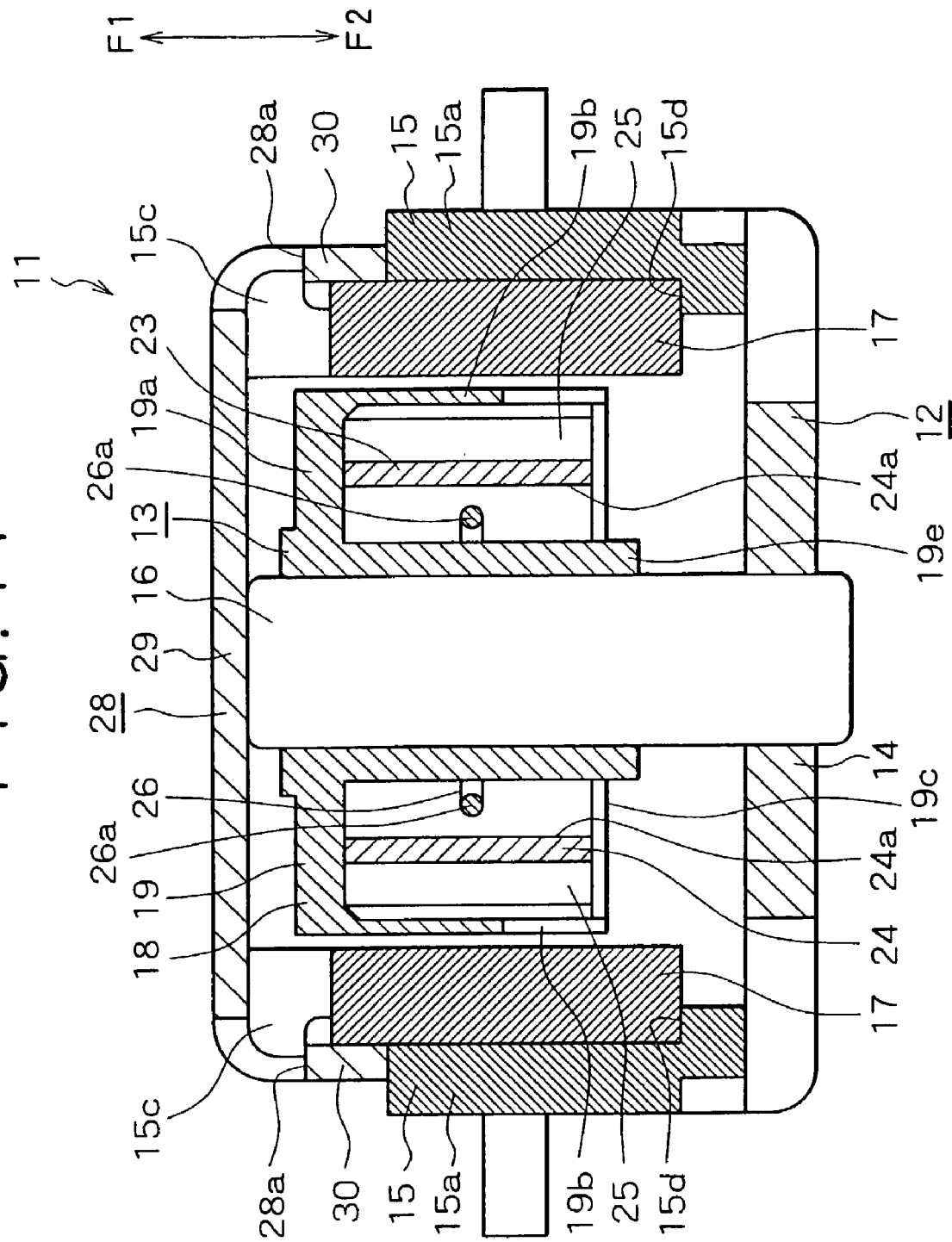
Figure 12:
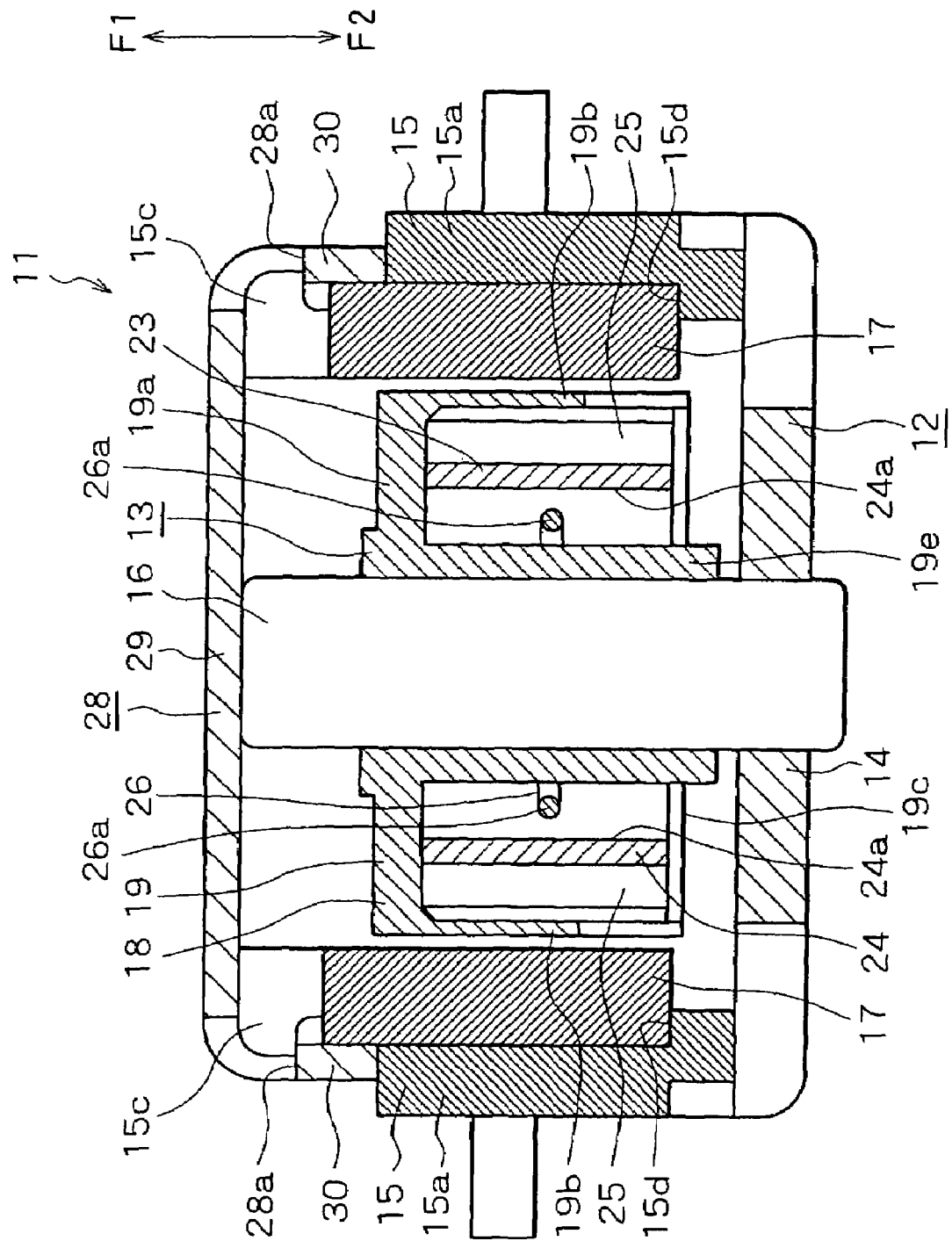

FIGS. 11 and 12 show movements of the movable portion 13 in the focusing direction.

FIG. 11 shows the condition where focusing control is performed and the movable portion 13 is moved in the direction F1. Since the focusing coil 24 is supplied with an electric current in such a direction as to move the movable portion 13 in the direction F1, the movable portion 13 is moved in the direction F1 from a neutral position thereof; in this case, a force in the direction F2 in which the projection portions 26*a* of the magnetic member 26 are pulled toward central portions of the magnetic fluxes generated from the magnets 17 is generated in the movable portion 13. Therefore, when the supply of electric current to the focusing coil 24 in such a direction as to move the movable portion 13 in the direction F1 is stopped, the movable portion 13 is moved in the direction F2 to return to the neutral position thereof (See FIG. 7).

FIG. 12 shows the condition where the focusing control is performed and the movable portion 13 is moved in the direction F2. Since the focusing coil 24 is supplied with an electric current in such a direction as to move the movable portion 13 in the direction F2, the movable portion 13 is moved in the direction F2 from the neutral position thereof; in this case, a force in the direction F1 in which the projection portions 26*a* of the magnetic member 26 are pulled toward the central portions of the magnetic fluxes generated from the magnets 17 is generated in the movable portion 13. Therefore, when the supply of the electric current to the focusing coil 24 in such a direction as to move the movable portion 13 in the direction F2 is stopped, the movable portion 13 is moved in the direction F1 to return to the neutral position thereof (See FIG. 7).

As has been described above, in each case where the movable portion 13 is moved in the focusing direction or the tracking direction from the neutral position thereof, a force for moving the movable portion 13 toward the neutral position is generated by the magnetic member 26 fitted to the supported tube portion 19*e* of the bobbin 18, so that the movable portion 13 is appropriately held in the neutral position in the focusing direction and the tracking direction by a required minimum number of members.

In addition, the holding of the movable portion 13 in its neutral position can be achieved appropriately and securely by simply forming the linear magnetic member 26 into a predetermined shape and fitting it to the bobbin 18. Therefore, it is possible to contrive a reduction in production cost through a reduction in the number of component parts and an enhancement of working efficiency.

As has been described above, in the disk drive device 1, no yoke is required on the inside of the magnets 17 as a component element of a magnetic circuit of the objective lens driver 11. Accordingly, it is possible to contrive a reduction in size and to secure good sensitivity.

FIG. 13 shows the experimental results of measurement of focusing acceleration sensitivity and tracking acceleration sensitivity, for the objective lens driver 11 according to the present invention and three kinds of objective lens drivers according to the related art. The objective lens drivers according to the related art are one of the same axial sliding type as the objective lens driver 11, one of the type in which a movable portion is supported on a fixed portion by a wire, and one of the type in which a movable portion is supported on a fixed portion by a leaf spring. The focusing acceleration sensitivity and the tracking acceleration sensitivity are given in acceleration (G) per unit volt (V); as the value is higher, bearable force is higher and the sensitivity is better.

As shown in FIG. 13, the objective lens driver 11 according to the present invention has good sensitivity, and has a good balance between the sensitivity in focusing and the sensitivity in tracking.

While the objective lens driver 11 in which two tracking coils 25 each are fitted to both side portions 24*a* of the focusing coil 24 has been shown in the above description, one focusing coil each may be provided at both side portions 24*a* of the focusing coil 24. In that case, in order to hold good sensitivity and secure appropriate operations, the tracking coils 25 must be disposed at symmetrical positions with respect to the center of the focusing coil 24, as shown in FIGS. 14 and 15.

The concrete shapes and structures of components shown in the embodiments above are merely concrete examples in carrying out the present invention, and these are not to be construed as limitative of the technical scope of the invention.

What is claimed is:

1. An objective lens driver comprising:
   a support base formed of a magnetic material, comprising a base portion, a support shaft projected from said base portion, and a pair of yokes respectively projected in the same direction as said support shaft from both side edges of said base portion and located oppositely to each other with said support shaft therebetween, said yokes having opposed surfaces to which magnets are fitted;
   a movable portion supported on said support shaft of said support base so as to be turnable around an axis of said support shaft and slidable in the axial direction of said support shaft, holding an objective lens having an optical axis substantially coinciding with the axial direction of said support shaft, and comprising a focusing coil supplied with a driving current at a time of focusing control of laser light radiated onto a recording medium through said objective lens, and at least a pair of tracking coils supplied with a driving current at a time of tracking control of said laser light; and
   a magnetic member formed in a roughly ring form, comprising a pair of projection portions maximum in outside diameter with a central portion therebetween, and fitted to said movable portion, said pair of projection portions being respectively attracted toward central portions of said magnets so as thereby to hold said movable portion in a neutral position in a focusing direction and in a tracking direction, wherein said magnets, said yokes, said base portion, and said support shaft form a magnetic circuit.

2. An objective lens driver according to claim 1, wherein said yokes are each provided with cover portions formed of a magnetic material, said cover portions covering surfaces at least on one side of said magnets in a direction orthogonal to the axial direction of said support shaft and orthogonal to a direction connecting said yokes.

3. An objective lens driver according to claim 1, further comprising:

a cover formed of a magnetic material located on the opposite side of said base portion of said support base with respect to said movable portion and covering said movable portion, wherein an end edge on the objective lens side of said cover is bent to the side of said movable portion to form a bent portion.

4. A disk drive device in which a disk recording medium fitted to a disk table is rotated by a driving motor, and a recording surface of said rotated disk recording medium is irradiated with laser light through an objective lens of an objective lens driver, said objective lens driver comprising:

a support base formed of a magnetic material, comprising a base portion, a support shaft projected from said base portion, and a pair of yokes respectively projected in the same direction as said support shaft from both side edges of said base portion and located oppositely to each other with said support shaft therebetween, said yokes having opposed surfaces to which magnets are fitted;

a movable portion supported on said support shaft of said support base so as to be turnable around an axis of said support shaft and slidable in the axial direction of said support shaft, holding said objective lens having an optical axis substantially coinciding with the axial direction of said support shaft, and comprising a focusing coil supplied with a driving current at a time of focusing control of laser light radiated onto said disk recording medium through said objective lens, and at least a pair of tracking coils supplied with a driving current at a time of tracking control of said laser light; and a magnetic member formed in a roughly ring form, comprising a pair of projection portions maximum in outside diameter with a central portion therebetween, and fitted to said movable portion, said pair of projection portions being respectively attracted toward central portions of said magnets so as thereby to hold said movable portion in a neutral position in a focusing direction and in a tracking direction, wherein said magnets, said yokes, said base portion, and said support shaft form a magnetic circuit.

5. A disk drive device according to claim 4, wherein said yokes are each provided with cover portions formed of a magnetic material, said cover portions covering surfaces at least on one side of said magnets in a direction orthogonal to the axial direction of said support shaft and orthogonal to a direction connecting said yokes.

6. A disk drive device according to claim 4, further comprising:

a cover formed of a magnetic material located on the opposite side of said base portion of said support base with respect to said movable portion and covering said movable portion, wherein an end edge on the objective lens side of said cover is bent to the side of said movable portion to form a bent portion.

7. An objective lens driver comprising:

a base formed of a magnetic material, comprising a support shaft projected in an optical axis direction of an objective lens, and at least a pair of magnet fitting portions to which magnets are respectively fitted;

a movable portion turnably and slidably provided on said support shaft, comprising said objective lens, a focusing coil supplied with a driving current at a time of focusing control of laser light radiated onto a recording medium through said objective lens, and a tracking coil supplied with a driving current at a time of tracking control of said laser light; and a ring-shaped mannetic member for elastically clamping said movable portion, wherein a pair of projection portions projected respectively to the sides of said magnets are provided at portions of said magnetic member opposite to each other with said movable portion therebetween, and said projection portions are respectively attracted toward center portions of said magnets so as thereby to hold said movable portion in a neutral position in a focusing direction and in a tracking direction, and wherein said support shaft, said magnets, and said magnet fitting portions form a magnetic circuit.

8. An objective lens driver according to claim 7, wherein each of said magnet fitting portions comprises an approximately U-shaped yoke provided oppositely to said focusing coil and said tracking coil with respect to said magnet so as to make contact with said magnet, and said yoke covers at least a main surface and a pair of side surfaces of said magnet.

9. An objective lens driver according to claim 7, further comprising:

a cover portion formed of a magnetic material so provided as to cover said focusing coil, said tracking coil, and said magnet, wherein one end of said cover portion opposed to said objective lens is bent to the side of said base.

10. A disk drive device in which a signal recoding surface of an optical disk being rotated is irradiated with laser light through an objective lens of an objective lens driver, said objective lens driver comprising:

a base formed of a magnetic material, comprising a support shaft projected in an optical axis direction of an objective lens, and at least a pair of magnet fitting portions to which magnets are respectively fitted;

a movable portion turnably and slidably provided on said support shaft, comprising said objective lens, a focusing coil supplied with a driving current at a time of focusing control of laser light radiated onto the optical disk through said objective lens, and a tracking coil supplied with a driving current at a time of tracking control of said laser light; and a ring-shaped magnetic member for elastically clamping said movable portion, wherein a pair of projection portions projected respectively to the sides of said magnets are provided at portions of said magnetic member opposite to each other with said movable portion therebetween, and said projection portions are respectively attracted toward center portions of said magnets so as thereby to hold said movable portion in a neutral position in a focusing direction and in a tracking direction, and wherein said support shaft, said magnets, and said magnet fitting portions form a magnetic circuit.

11. A disk drive device according to claim 10, wherein each of said magnet fitting portions comprises an approximately U-shaped yoke provided oppositely to said focusing coil and said tracking coil with respect to said magnet so as to make contact with said magnet, and said yoke covers at least a main surface and a pair of side surfaces of said magnet.

12. A disk drive device according to claim 10, further comprising:

a cover portion formed of a magnetic material so provided as to cover said focusing coil, said tracking coil, and said magnet, wherein one end of said cover portion opposed to said objective lens is bent to the side of said base.

* * * * *